(12) United States Patent
Connolly

(10) Patent No.: US 9,636,943 B2
(45) Date of Patent: *May 2, 2017

(54) WHEEL WITH HIGH STRENGTH FLEXIBLE SPOKES

(71) Applicant: Spinergy Inc., Carlsbad, CA (US)

(72) Inventor: Martin Connolly, San Marcos, CA (US)

(73) Assignee: SPINERGY INC.

( * ) Notice: Subject to any disclaimer, the term of this patent is extended or adjusted under 35 U.S.C. 154(b) by 0 days.

This patent is subject to a terminal disclaimer.

(21) Appl. No.: 14/667,477

(22) Filed: Mar. 24, 2015

(65) Prior Publication Data
US 2016/0009125 A1    Jan. 14, 2016

Related U.S. Application Data

(63) Continuation-in-part of application No. 13/487,253, filed on Jun. 4, 2012, now Pat. No. 8,985,707.

(51) Int. Cl.
| | | |
|---|---|---|
| *B60B 1/02* | (2006.01) | |
| *B60B 5/02* | (2006.01) | |
| *B60B 1/04* | (2006.01) | |
| *B60B 21/06* | (2006.01) | |

(52) U.S. Cl.
CPC .......... *B60B 1/0246* (2013.01); *B60B 1/0261* (2013.01); *B60B 1/042* (2013.01); *B60B 1/044* (2013.01); *B60B 5/02* (2013.01); *B60B 21/062* (2013.01); *B60B 2360/32* (2013.01); *B60B 2900/111* (2013.01); *B60B 2900/1216* (2013.01); *B60B 2900/311* (2013.01); *B60B 2900/313* (2013.01); *B60Y 2200/12* (2013.01); *B60Y 2200/13* (2013.01); *B60Y 2200/84* (2013.01)

(58) Field of Classification Search
CPC ....... B60B 1/003; B60B 1/0261; B60B 1/041; B60B 1/042; B60B 1/043; B60B 1/044; B60B 1/045; B60B 1/046; B60B 5/02; B60B 21/062; B60B 21/064
See application file for complete search history.

(56) References Cited

U.S. PATENT DOCUMENTS

| | | | |
|---|---|---|---|
| 8,985,707 B1 * | 3/2015 | Connolly | B60B 1/0261 301/104 |
| 8,985,708 B2 * | 3/2015 | Connolly | B60B 1/04 301/104 |
| 2010/0078987 A1 * | 4/2010 | Lubecki | B60B 1/003 301/56 |
| 2011/0215636 A1 * | 9/2011 | Huang | B60B 1/02 301/56 |

* cited by examiner

*Primary Examiner* — Kip T Kotter
(74) *Attorney, Agent, or Firm* — Gary L. Eastman, Esq.; Eastman & McCartney LLP

(57) ABSTRACT

A wheel with flexible spokes, including a rim and hub, and spokes between the rim and hub made of fibrous material that causes the spokes to be both lighter in weight and stronger than comparable steel spokes. The spokes are also flexible and resilient such that they can bend while retaining their integrity and strength.

14 Claims, 9 Drawing Sheets

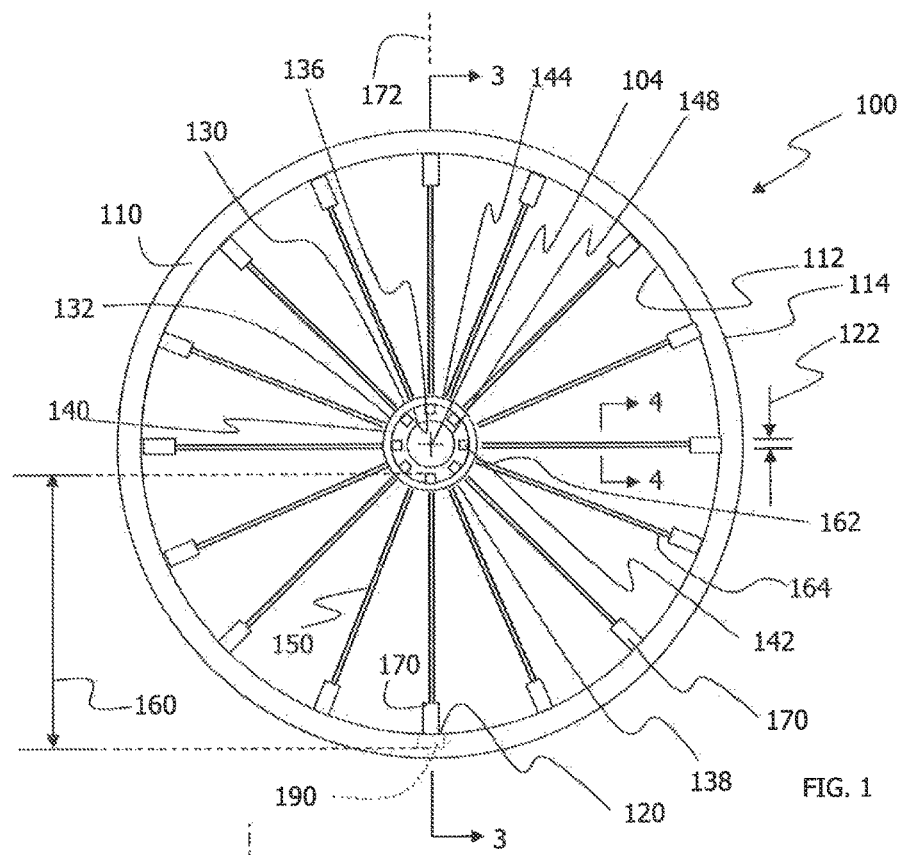
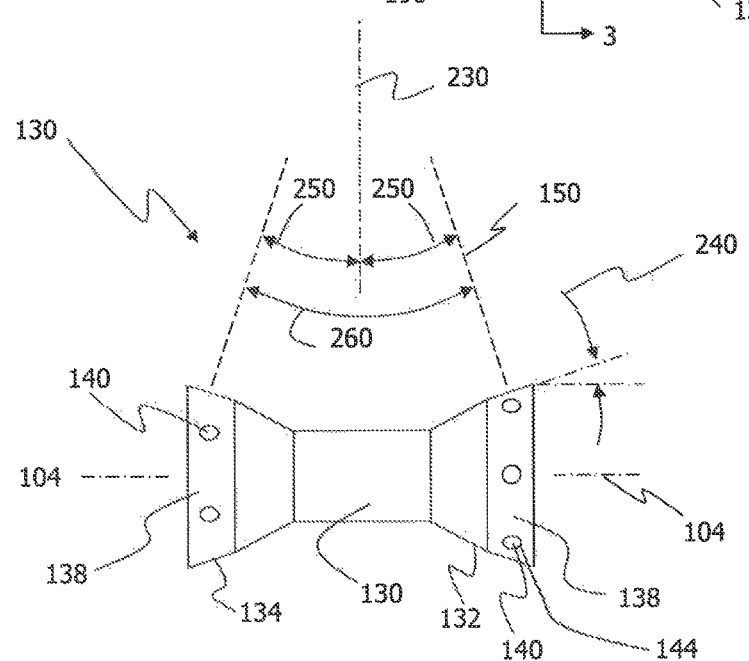
FIG. 1
FIG. 2

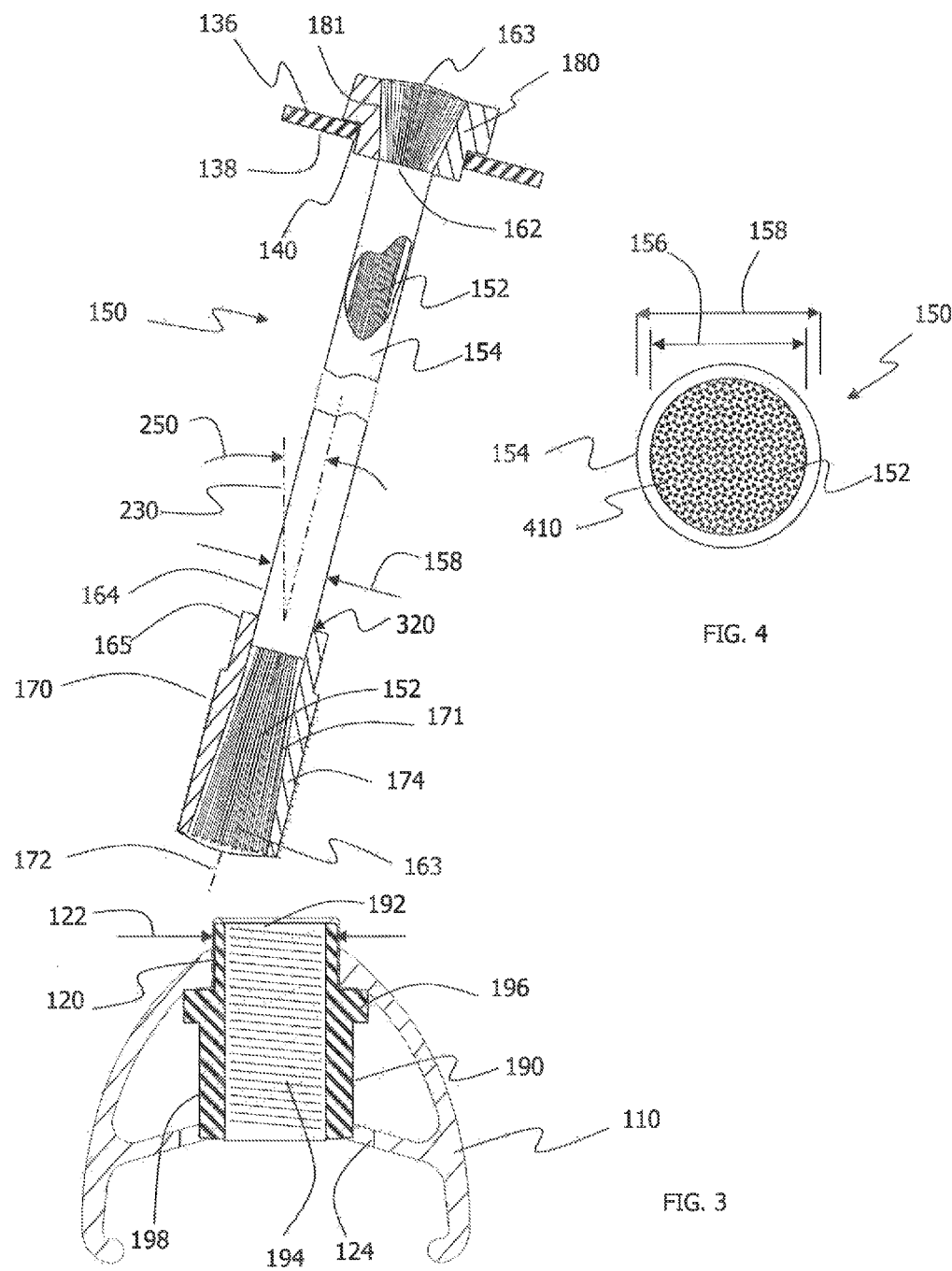

WHEEL WITH HIGH STRENGTH FLEXIBLE SPOKES

RELATED APPLICATION

This application is a continuation-in-part of, and claims the benefit of priority to, U.S. Utility patent application Ser. No. 13/492,573 entitled "Wheel With High Strength Flexible Spokes," filed Jun. 8, 2012, now U.S. Pat. No. 8,985,708, which is a continuation-in-part of, and claims the benefit of priority to, U.S. Utility patent application Ser. No. 13/487,253 entitled "Wheel With Flexible Wide-Body Spokes," filed Jun. 4, 2012, now U.S. Pat. No. 8,985,707.

FIELD OF INVENTION

The present invention is directed to vehicular wheels having high-strength and light-weight spokes, particularl bicycle, motorcycle, and wheelchair wheels.

BACKGROUND OF INVENTION

The most common construction for bicycle wheels includes spokes made of stainless steel or other metal. While stainless steel is strong, it is also heavy. Therefore, the spokes must be made as thin as possible to make them as light as possible. However, the thinner the spoke, the less strength it has. The thicker the spoke, the stronger it is. Therefore, in making spokes of steel, there is a tradeoff between making the spokes strong and making them lightweight. Thus, there is a need for a wheel with spokes that can be both lightweight and strong without having to deal with this tradeoff between the two. Another problem with steel spokes is that, if they are bent, they weaken and ultimately fail such that they must be replaced if bent.

One solution to this problem was presented in U.S. Pat. No. 5,110,190 which issued to Harold Johnson on May 5, 1992, for an invention entitled "High Modulus Multifilament Spokes And Method" (hereinafter the '190 patent). The '190 patent is fully incorporated herein by this reference. The '190 patent discloses a high modulus multifilament non-rigid and rigid wheel spoke that includes a fiber midportion between a first and second end having attachment members affixed thereto. The '190 patent also discloses methods of supporting a hub within a wheel rim by means of a plurality of spokes or by means of continuous lengths of spokes.

While the device presented in the '190 patent clearly made advancements over the state of the art at that time, the device nevertheless has its shortcomings. For instance, the small diameter of the filament spokes requires that the spokes be maintained in a substantially axial arrangement with its connectors. This, unfortunately, makes the manufacturing of wheels incorporating the '190 technology more difficult due to the of off-axis tension. Specifically, even though the spokes of the '190 patent are orders of magnitude stronger than their metallic counterparts, the strength of the '190 spokes is slightly decreased from its maximum strength due to the bend in the spokes as they leave the wheel rim when installed in a wheel.

U.S. Pat. No. 6,036,281 which issued on Mar. 14, 2000, to Richard Campbell and entitled "Low Rotational Mass Bicycle Wheel System" (hereinafter the '281 patent), disclosed a bicycle wheel system having spokes extending radially from hub to spoke. The spokes are provided with fittings at its rim end which are constructed with minimal mass and fittings at the hub end which allow adjustment of the tension of the spoke. The spokes are constructed of a bundle of liquid crystal fibers having no significant creep surrounded by an extruded plastic jacket.

While the spoke presented in the '281 patent certainly represents a milestone in bicycle wheel technology and light-weight wheel manufacturing, it nevertheless has its challenges with implementation. First of all, there are manufacturing challenges in keeping the spokes aligned with their connectors. In narrow-width wheel applications, the device disclosed in the '281 are difficult to install as the alignment is important. This alignment results in increased assembly costs and overall product costs.

The present invention resolves these problems by providing spokes that are both lighter in weight than steel and significantly stronger than steel, and that are flexible such that they can bend without suffering damage. Moreover, due to their significant strength and durability, fewer numbers of spokes are required on wheels while still providing a light-weight wheel with superior strength. Further, the addition of aerodynamic jackets over the spoke work to reduce drag as the spoke rotates during use.

SUMMARY OF THE INVENTION

The wheel with flexible wide-body spokes of the present invention provides the aforementioned advantages by providing a wheel including a rim and hub, and spokes between the rim and hub made of fibrous material that causes the spokes to be both lighter in weight and stronger than comparable steel spokes. The spokes are also flexible and resilient such that they can bend while retaining their integrity and strength. Further, an aerodynamic cover is formed over the fibrous material

BRIEF DESCRIPTION OF DRAWINGS

The aforementioned and other advantages of the wheel with flexible spokes of the present invention will become more apparent to those skilled in the art upon making a thorough review and study of the following detailed description of the invention when reviewed in conjunction with the drawings in which like references numerals refer to like parts, and wherein:

FIG. 1 is a side view of a first preferred embodiment of the wheel with flexible spokes of the present invention, showing the rim, hub, spokes between rim and hub, tubes attaching each spoke to the rim, and anchors attaching each spoke to the hub;

FIG. 2 is a rear detail view of the first preferred embodiment of the wheel with flexible spokes of the present invention, showing the hub, the angle between spokes on the left side of the wheel and spokes on the right side of the wheel, and the angle of the hub surface at the point of attachment of each spoke to the hub;

FIG. 3 is a cross-sectional view of the first preferred embodiment of the wheel with flexible spokes of the present invention, taken across line 3-3 of FIG. 1, showing cross-sectional portions of the rim and hub, and showing how each tube attaches each spoke to the rim via a nipple in the rim, and how each anchor attaches each spoke to the hub;

FIG. 4 is a cross-sectional view of the first preferred embodiment of the wheel with flexible spokes of the present invention, taken across line 4-4 of FIG. 1, showing a cross-sectional view of the fibers and jacket of one of the spokes;

DETAILED DESCRIPTION OF THE INVENTION

Figure 5:
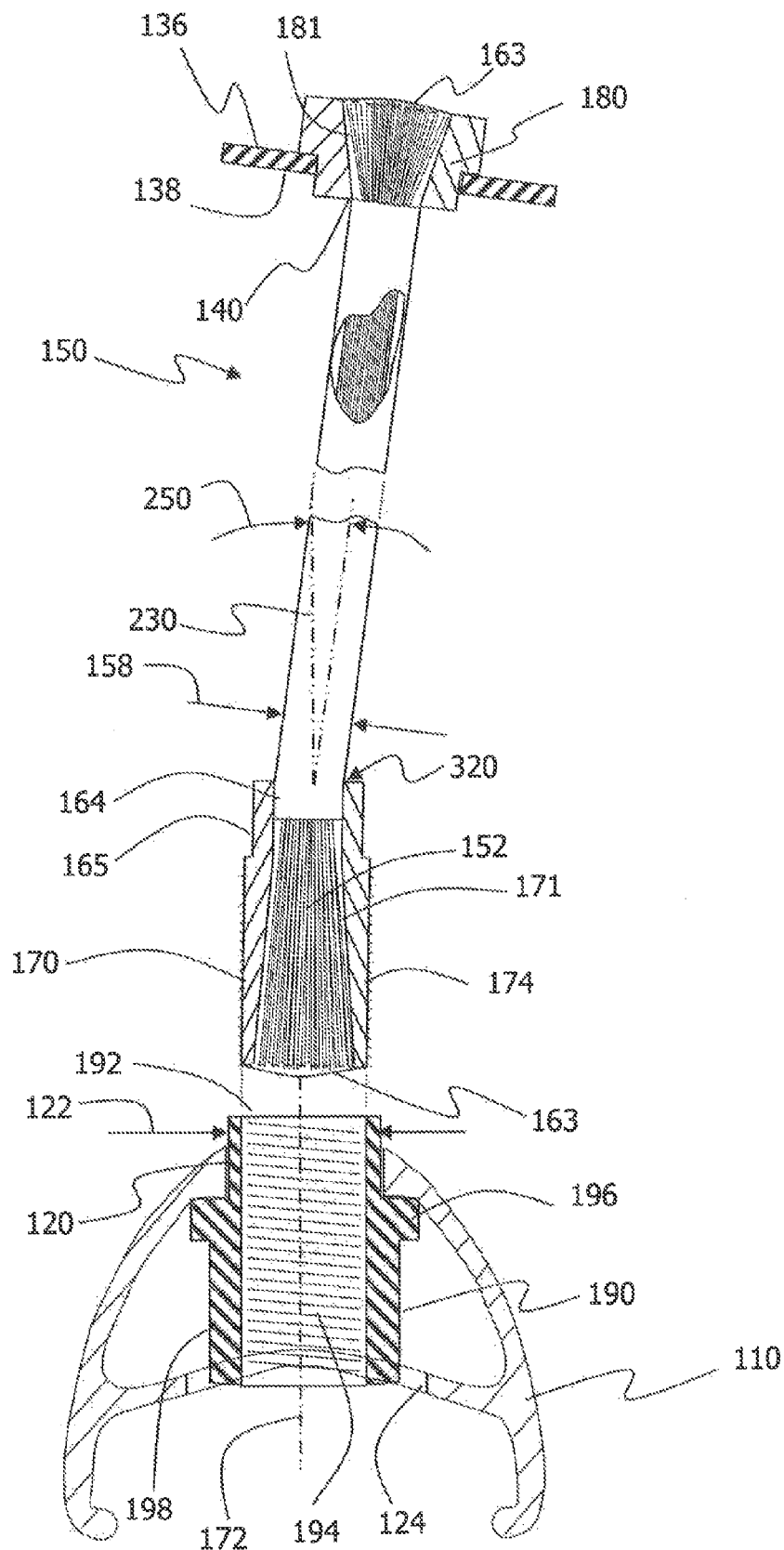
FIG. 5 is a cross-sectional view of the first preferred embodiment of the wheel with flexible spokes of the present invention showing cross-sectional portions of the rim and hub, and showing how each tube, once attached to the rim, would extend away at an angle from the nipple in the rim.

Referring to FIG. 1, a side view of a first preferred embodiment of the wheel with flexible spokes of the present invention is shown and generally designated 100. In FIG. 1, the side of wheel 100 facing the viewer can be referred to as the right side of the wheel 100. The side of wheel 100 opposite the right side can be referred to as the left side of the wheel 100. The wheel 100 has a wheel axis 104, and a rim 110 which has an inner perimeter 112 and an outer perimeter 114. Direction 102 is the preferred direction of rotation of wheel 100 however it is to be appreciated that wheel 100 is free to rotate in the direction opposite direction 102.

Still referring to FIG. 1, with reference to FIG. 2 and FIG. 3, distributed symmetrically along inner perimeter 112 are spoke holes 120. Each spoke hole 120 has a spoke hole width 122. Along the outer perimeter 114 are nipple access holes 124 (not visible in FIG. 1, see FIG. 3), one nipple access hole 124 adjacent each spoke hole 120. Wheel 100 further includes a hub 130 having a right flange 132 and a left flange 134 (not visible, behind right flange 132). Each flange 132 and 134 has an inner surface 136 and an outer surface 138. In each flange 132 and 134 are flange holes 140, each flange hole 140 corresponding to a unique spoke hole 120. Each flange hole 140 has an inner opening 142 in the corresponding inner surface 136, and an outer opening 144 in the corresponding outer surface 138. Hub 130 also has a barrel 148 which receives an axle of a bicycle.

Wheel 100 further includes non-rigid spoke members, or spokes 150. Each spoke 150 has non-rigid fibers 152 (not visible this Figure) covered by a jacket 154 having an inner diameter 156 (not visible) and an outer diameter 158 which is also the width 158 of spoke 150. Each spoke 150 has a length 160. Fibers 152 are substantially continuous along the length 160 of spoke 150 Alternatively, one or more of fibers 152 may be less than continuous along the length of spoke 150. Each spoke 150 has an inner end 162 adjacent hub 130, and an outer end 164 adjacent rim 110. Each spoke 150 has a tube 170 about its outer end 164, and each tube 170 is formed with a tapered bore 171 opening away from the tube axis 172 of the spoke 150. Each tube 170 is affixed to its corresponding outer end 164 by inserting the fibers 152 into the tube 170, and filling the tube 170 with epoxy 163. Once hardened, the epoxy 163 and fibers 152 form a wedge within the tapered bore 171 such that any tension on the spoke 150 draws the hardened wedge against the taper thereby securing the fiber within the tube 170. Alternatively, tube 170 may be affixed to outer end 164 by any other material of similar strength. Tube 170 may be equipped with a hexagonal, reinforced head 165 which provides for added strength at the rim-end 164 of the tube 170. This is helpful in preventing breakage from non-axial tension on spoke 150, and facilitates the tightening of spoke 150.

Each tube 170 has a tube axis 172 and external spoke threads 174. Each spoke 150 also has an anchor (or eyelet or ferrule) 180 about its inner end 162. Each anchor 180 is formed with a tapered bore 181 opening away from the tube axis 172. Each anchor 180 is affixed to its corresponding inner end 162 by inserting the fibers 152 into the anchor 180, and filling the tapered bore 181 with epoxy 163. Once hardened, the epoxy 163 and fibers 152 form a wedge within the tapered bore 181 formed in the anchor 180 such that any tension on the spoke 150 draws the hardened wedge against the tapered bore 181 thereby securing the fiber 150 within the anchor 180. Alternatively, anchor 180 may be affixed to inner end 162 by any other material of similar strength.

Each flange hole 140 is wider than spoke 150 but narrower than anchor 180, such that tube 170 about outer end 164 can be passed into inner opening 142 and out of outer opening 144, and such that the rest of spoke 150 can then be passed through flange hole 140 until anchor 180 comes into contact with inner surface 136 around inner opening 142, which causes inner end 162 to be retained in flange hole 140 by anchor 180.

Wheel 100 also includes nipples 190. One nipple 190 is shown in FIG. 1 in broken line, inside rim 110. There is a nipple 190 between each spoke hole 120 and its corresponding nipple access hole 124. Each nipple 190 has a nipple opening 192, nipple threads 194 inside nipple opening 192, a collar 196, and a nipple head 198. Once each spoke 150 is passed through flange hole 140 until anchor 180 comes into contact with inner surface 136 around inner opening 142, tube 170 is positioned and threaded into the corresponding nipple 190 via inter-engagement of spoke threads 174 with nipple threads 194. This causes tube 170 to be retained in nipple 190 such that tube axis 172 is perpendicular to wheel axis 104 (shown in FIG. 1). The retention of tube 170 in nipple 190 and of inner end 162 in flange hole 140 by anchor 180 causes spoke 150 to be held taut between rim 110 and hub 130.

FIG. 1 shows eight (8) spokes 150 attached to right flange 132, and eight (8) spokes 150 attached to left flange 134 (not visible, behind right flange 132), for a total of sixteen (16) spokes 150. Wheel 100 may alternatively have more or fewer than sixteen (16) spokes 150. For example, wheel 100 may have twelve (12) spokes 150, six (6) spokes 150 attached to each of flanges 132 and 134. While it is also possible to have different numbers of spokes 150 attached to each of flanges 132 and 134, having the same number of spokes attached to each of flanges 132 and 134 balances the load on the flanges 132 and 134.

FIG. 2 is a rear view of hub 130. FIG. 2 shows the angle 250 that one of the spokes 150 is attached to right flange 132, and the corresponding angle 250 that one of the spokes 150 is attached to left flange 134. In FIG. 2, the right side of wheel 100 is on the right side of FIG. 2, and the left side of wheel 100 is on the left side of FIG. 2, Broken line 230 in FIG. 2 represents a plane 230 that bisects wheel 100 between the right side and left side of wheel 100. Plane 230 is perpendicular to wheel axis 104. Each outer surface 138 has the shape of a conical section that has an angle 240 to wheel axis 104. Each spoke 150 extends perpendicularly from the corresponding outer surface 138. Therefore, each spoke 150 extends from outer surface 138 at an angle 250 to plane 230. This means that the magnitude of angle 260 between spoke 150 attached to right flange 132 and spoke 150 attached to left flange 134, is twice the magnitude of angle 250.

FIG. 3 shows a partial cross-sectional detail view of a spoke 150 with its inner end 162 retained in flange hole 140 by anchor 180, and tube 170 about to be received in nipple 190 in rim 110. FIG. 3 shows how nipple 190 is retained in spoke hole 120. Spoke hole width 122 allows the portion of nipple 190 around nipple opening 192 to pass through spoke hole 120, but does not allow collar 196 to pass through spoke hole 120, such that nipple is retained in spoke hole 120 by the tension of spoke 150 on nipple 190 once tube 170 is threaded into nipple 190. FIG. 3 also shows spoke threads 174 which inter-engage with nipple threads 194 in thread tube 170 into nipple 190. With tube 170 retained in nipple 190, tube axis 172 is perpendicular to wheel axis 104 (not shown, see FIG. 2) and intersects the corresponding spoke hole 120. Spoke holes 120 lie in plane 230. While spoke holes 120 may alternatively be adjacent plane 230, spoke holes 120 being in plane 230 causes the forces of spokes 150 to be placed on rim 110 where plane 230 intersects rim 110, which is the middle of the inner perimeter 112 of rim 110. With spoke holes 120 in plane 230, and each tube 170 received in the corresponding nipple 190, tube axis 172 also lies in plane 230 (as shown in FIG. 5).

Referring now to FIG. 5, when each tube 170 is received in the corresponding nipple 190, tube axis 172 also lies in plane 230 and tube axis 172 coincides with the broken line representing plane 230. However, because each spoke 150 extends at angle 250 to plane 230, each spoke 150 extends from its tube 170 at angle 250 to tube axis 172. This means that there is a bend in spoke 150 at an angle 250 at the point 320 where spoke 150 protrudes from tube 170, With steel spokes, such a bend would weaken the spoke and ultimately cause the spoke to fail. However, with spokes 150, such a bend does not damage spokes 150, because fibers 152 are flexible and resilient yet strong such that spokes 150 retain their integrity and strength even when bent under tension in the manner described. Therefore, spokes 150 can bend without weakening or failing. Furthermore, each of spokes 150 is three times as strong, and weighs half as much, as a steel spoke that would otherwise be used in its place. This allows the width 158 of each of spokes 150 to be greater than that of a steel spoke that would be used in its place. In the alternative, the width 158 of each spoke 150 may be less than or equal to the width of a steel spoke that would be used in its place; the strength of each of spokes 150 may be greater or less than three times that of a steel spoke that would be used in its place; and the weight of each of spokes 150 may be greater or less than half that of a steel spoke that would be used in its place.

Rim 110, hub 130, tube 170, anchor 180 and nipple 190, in a preferred embodiment, are made of aluminum. Alternatively, any of rim 110, hub 130, tube 170, anchor 180 or nipple 190 may be made of any other material of comparable strength. In a preferred embodiment of the present invention, fibers 152 are a bundle of thermotropic liquid crystal fibers that exhibit high strength, low creep, and weather resistance. For instance, the fibers could be a PBO fiber such as Zylon®, a strong yet lightweight fiber, available from Toyobo. Alternatively, fibers 152 may be made of any other material having comparable weight and strength. Jacket 154 is made of Rilsan®, a high performance polyamide. Alternatively, jacket 154 may be made of any other material having comparable weight and strength. Each nipple access hole 124 allows access to nipple head 198 so that it can be turned to facilitate the threading of nipple 190 onto tube 170. For instance, a hexagonal head nut-driver may be positioned over nipple 190 and rotated to tighten spoke 150 in place.

FIG. 4 shows a cross-sectional detail view of the inside of a spoke 150, showing the fibers 152, outer diameter 158, and inner diameter 156 of jacket 154. Fibers 152 are gathered in forty-four (44) bundles 410 of nine hundred ninety-six (996) fibers 152 in each bundle, for a total of 43,824 fibers 152 in spoke 150. This great number of fibers 152 is one factor contributing to the great strength of spoke 150, while minimizing the weight of spoke 150. Spoke 150 has a breaking strength of 3,600 pounds. Alternatively, the number of bundles 410 may be greater or less than 44; the number of filaments in each bundle 410 may be greater or less than 996; and the breaking strength of spoke 150 may be greater or less than 3,600 pounds.

Referring back to FIG. 5, the cross-sectional view of the first preferred embodiment of the wheel with flexible spokes of the present invention showing cross-sectional portions of the rim and hub is shown, As can be appreciated from FIG. 5, the width of rim 110 is just slightly wider than the width of nipple 190. As a result, it is necessary that nipple 190 be aligned so that the spoke 150 extends radically inward from rim 110. Because of this positioning, it is important that spoke 150 be flexible as it leaves nipple 190 so as to accommodate angle 250 without any decrease in strength and durability. Due to the number of fibers 152 contained within spoke 150, there is no noticeable decrease in strength despite the off-axis tension.

When tension is applied to spoke 150, collar 196 strikes the inside surface of rim 110 and maintains the nipple 190, and corresponding sleeve, in its perpendicular arrangement.

Figure 6:
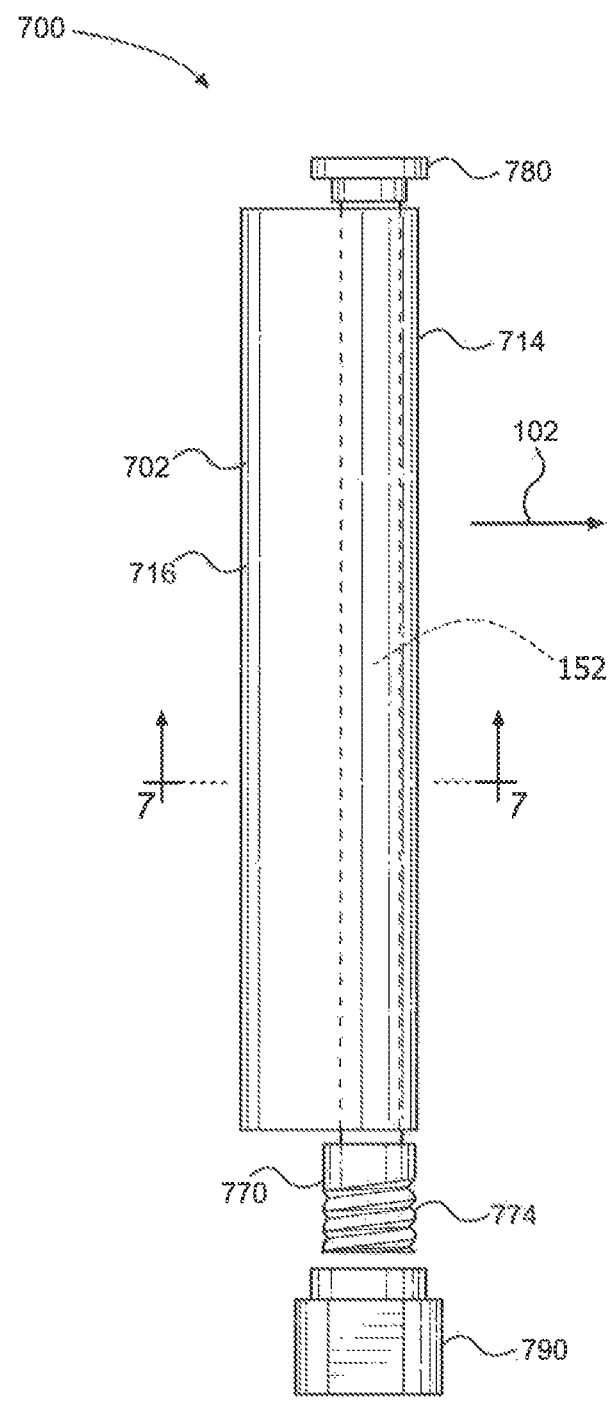
FIG. 6 is a side view of an alternative embodiment of the wheel with flexible spokes of the present invention showing a flexible spoke formed with a jacket having an aerodynamic tear-drop shape.

Referring to FIG. 6, an alternative embodiment of the flexible spoke is shown and generally designated 700. Spoke 700 consists of a tube 770 having threads 774, an anchor 780, and a jacket 702. When mounted into rim 110, threads 774 engage with threads 194 (not shown, see FIG. 5) in nipple 790. Tube 770 having threads 774, anchor 780, and nipple 790 are substantially similar to tube 170 having threads 174, anchor 180, and nipple 190 as described and fully detailed above in FIGS. 1-5, respectively. In this alternative embodiment, jacket 702 is formed in the shape of a teardrop (see FIG. 8). As is known in the industry, teardrop shapes are efficient due to the reduced amount of drag produced by the flow of air over the shape. In this embodiment, jacket 702 consists of a leading edge 714 and a trailing edge 716. When spoke 700 in installed in wheel 100, spoke 700 is oriented such that leading edge 714 points in direction 102, which is the direction of rotation of wheel 100. It is to be appreciated that trailing edge 716 points in the direction opposite direction 102.

In this embodiment, the teardrop shape creates less drag than a typical round spoke due the reduced drag created by the teardrop shaped jacket 702. Less drag is due to the reduced wake created when spoke 700 rotates through aft as compared to a typical round spoke. A typical round spoke has only 50% of the drag of a flat plate traveling at the same rate through the air. However, a properly dimensioned teardrop shape has 5% or less of the drag of a flat plate traveling at the same rate through the air. Even an improperly dimensioned teardrop shape has approximately 5%-20% of the drag of a flat plate traveling at the same rate through the air.

During typical bicycle racing, riders can achieve speeds of 40 mph. For a typical wheel, this means that the outer end of spoke 700 is also traveling at approximately 40 mph thereby creating increased drag as measured when moving away from the hub of the wheel. Assuming a racing bike wheel has a diameter of 22 inches, 40 mph roughly translates into the rim portion of the wheel rotating at 704 inches per second, meaning that the outer portion of a spoke is also moving through the air at approximately 704 inches per second. In contrast, the portion of the spoke measured at 6 inches from the center of the wheel's hub is traveling at 333 inches per second. When racing, this increased drag caused by round spokes moving at the above mentioned speeds reduces the bicycle's speed thereby requiring the expending of more energy to maintain the desired speed of 40 mph. As the number of spokes is increased, the amount of drag created by the spokes also increases.

To minimize the amount of drag created by the round spokes moving through the air, an aerodynamic jacket is applied to the spoke. In FIG. 6, a teardrop jacket 702 is shown applied to a spoke 700. When jacket 702 is properly applied to the spoke 700 such that leading edge 714 travels in direction 102, spoke 700 will have greatly reduced drag effects, up to 95% less than round spokes without an aerodynamic cover. The reduced drag results in a reduced amount of energy required to maintain any given speed. Alternatively, a higher speed may be achieved when applying the same amount of energy to a wheel having typical round spokes. This reduced drag effect will be a substantial benefit to a person racing on a bike with aerodynamic spokes as compared to a person racing without aerodynamic spokes since, in part, the difference between $1^{st}$ and $10^{th}$ place in a bicycle race can be one (1) second or less. Over the course of a bicycle race, the reduced drag can result in decreasing race times by several seconds.

Figure 7:
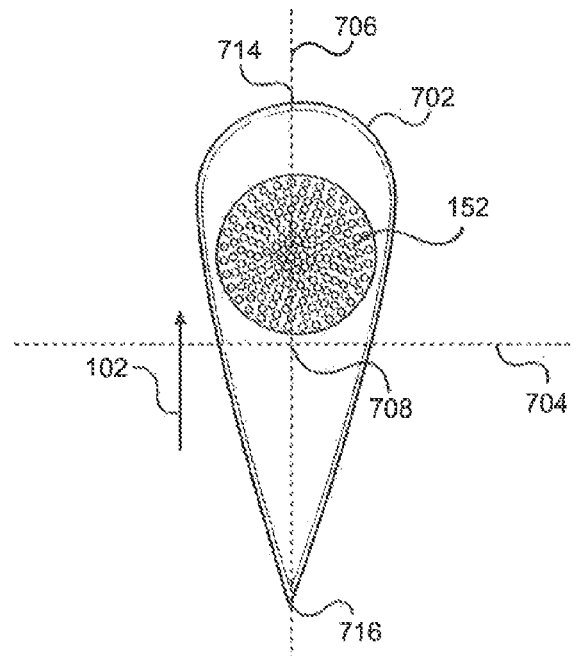
FIG. 7 is a cross-sectional view of a flexible spoke of the present invention as taken through line 7-7 of FIG. 6 having a jacket over the central fibers formed in an aero-dynamic teardrop shape.

Moving on to FIG. 7, a cross-section of the spoke 700 taken through line 7-7 of FIG. 6 is shown. Fibers 152 are shown with a jacket in the shape of a teardrop formed around fibers 152, having a leading edge 714 and a trailing edge 716. Fibers 152 are located in the leading half of the spoke 700 as defined by line 704. Fibers 152 are also located in the centerline of spoke 700 as defined by line 706. It is to be appreciated that fibers 152 may be located at any point along line 706 from intersection 708 to leading edge 714, with fibers 152 typically located around the mid-point of the line between intersection 708 and leading edge 714.

Figure 8:
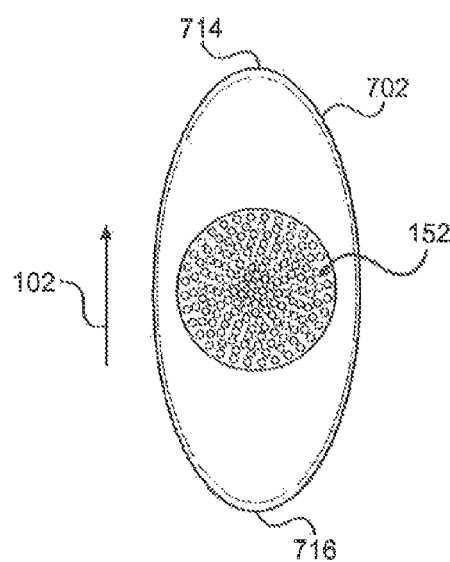
FIG. 8 is a cross-sectional view of a flexible spoke of the present invention having a jacket formed over the central fibers in an aero-dynamic oblong shape.
Figure 9:
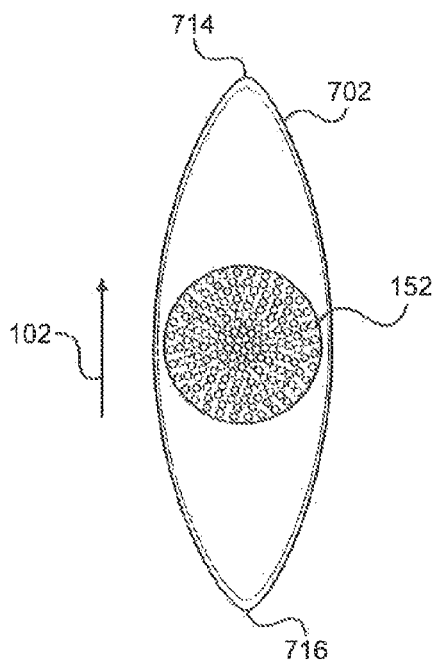
FIG. 9 is a cross-sectional view of a flexible spoke of the present invention having a jacket formed over the central fibers in an aero-dynamic shape having a pointed leading and trailing edge.

FIGS. 6 and 9 show alternative cross-sections of an aerodynamic spoke. FIG. 8 shows a cross section view of an aerodynamic spoke formed in an oblong shape. In this embodiment, the spoke must be oriented such that the leading edge 714 and trailing edge 716 are in-line with direction 102. FIG. 9 is another alternative embodiment of the present invention. FIG. 9 shows a cross section view of an aerodynamic spoke formed with a pointed leading edge 714 and trailing edge 716. As with the embodiment in FIG. 8, aerodynamic spoke 730 must be oriented such that leading edge 714 and trailing edge 716 are in-line with direction 102. Similar to the tear drop shape discussed in relation to FIG. 7, the oblong shape and the pointed shape spokes will also work to reduce drag created by the spoke as it rotates in the air.

Figure 10:
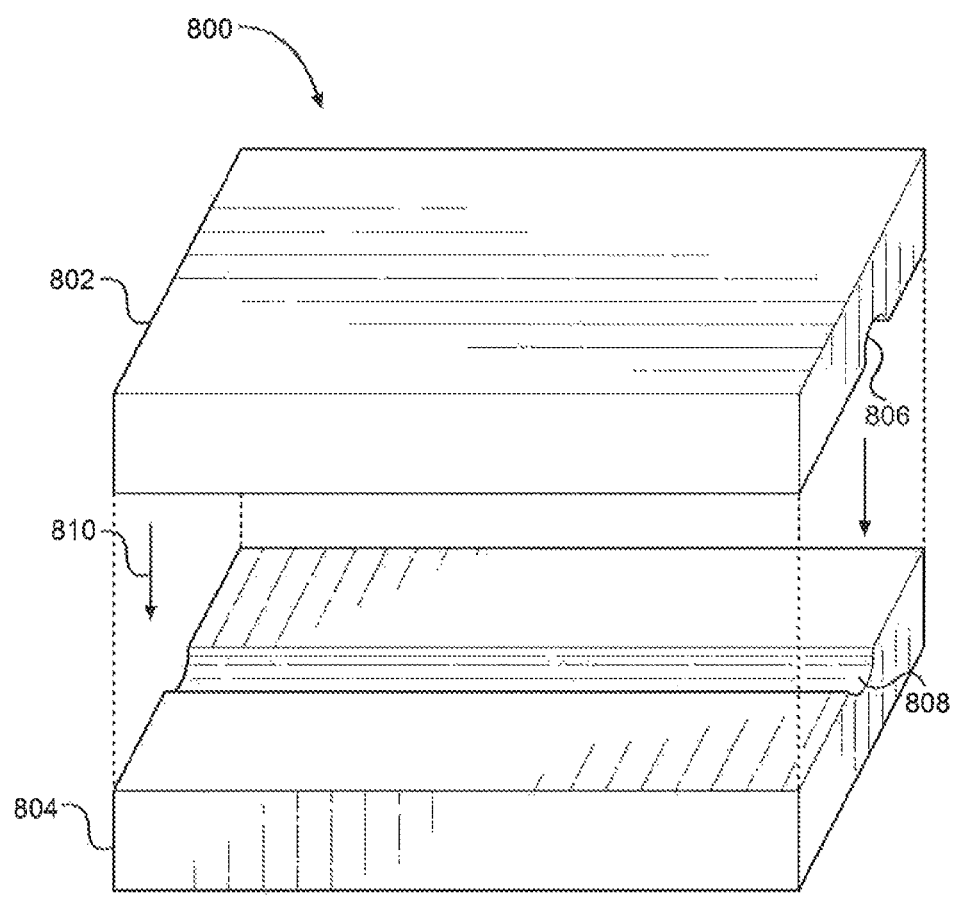
FIG. 10 is a perspective view of a mold used to form the jacket in a desired shape around the central fiber bundle.

Now referring to FIG. 10, a mold for manufacturing the aerodynamic spoke of the present invention is shown and generally designated 800. Mold 800 consists of upper block 802 and lower block 804. Upper block 802 has an upper channel 806 formed in the shape of the desired jacket, such as the teardrop shape of FIG. 7. Lower block 804 has a lower channel 808 corresponding to upper channel 806. To manufacture an aerodynamic spoke of the present invention, Fibers 152 are gathered into the desired number of bundles and cut to the desired length to form bundle 410. Bundle 410 is then placed in lower channel 808 of lower block 804 such that the ends of bundle 410 extend beyond the edges of lower block 804. Upper block 802 is then secured to lower block 804 in direction 810 such that bundle 410 is located in the space formed between upper and lower channels 806 and 808. The desired material used to form the jacket is then injected into the channel causing the material to form in the shape of the space created by upper and lower channels 806 and 808. After the newly formed aerodynamic spoke has solidified in mold 800, upper block 802 and lower block 804 are separated thereby releasing the spoke from the mold 800.

Due to the shape and size of an aerodynamic spoke of the present invention 150 as compared to a traditional spoke, jacket 702 may not pass through flange hole 140 thereby preventing the assembly of the spoke into wheel 100. To overcome this limitation, anchor 180 may be designed such that inner end 162 is formed with a tube similar to tube 170 having threads on the outside of the tube. To assemble wheel 100, the near end 162 of spoke with aerodynamic jacket 150 is inserted through flange hole 140 then secured with a nipple, similar to nipple 190. Far end 164 is then inserted into nipple 190 and tightened until the desired tension is achieved.

Figure 11:
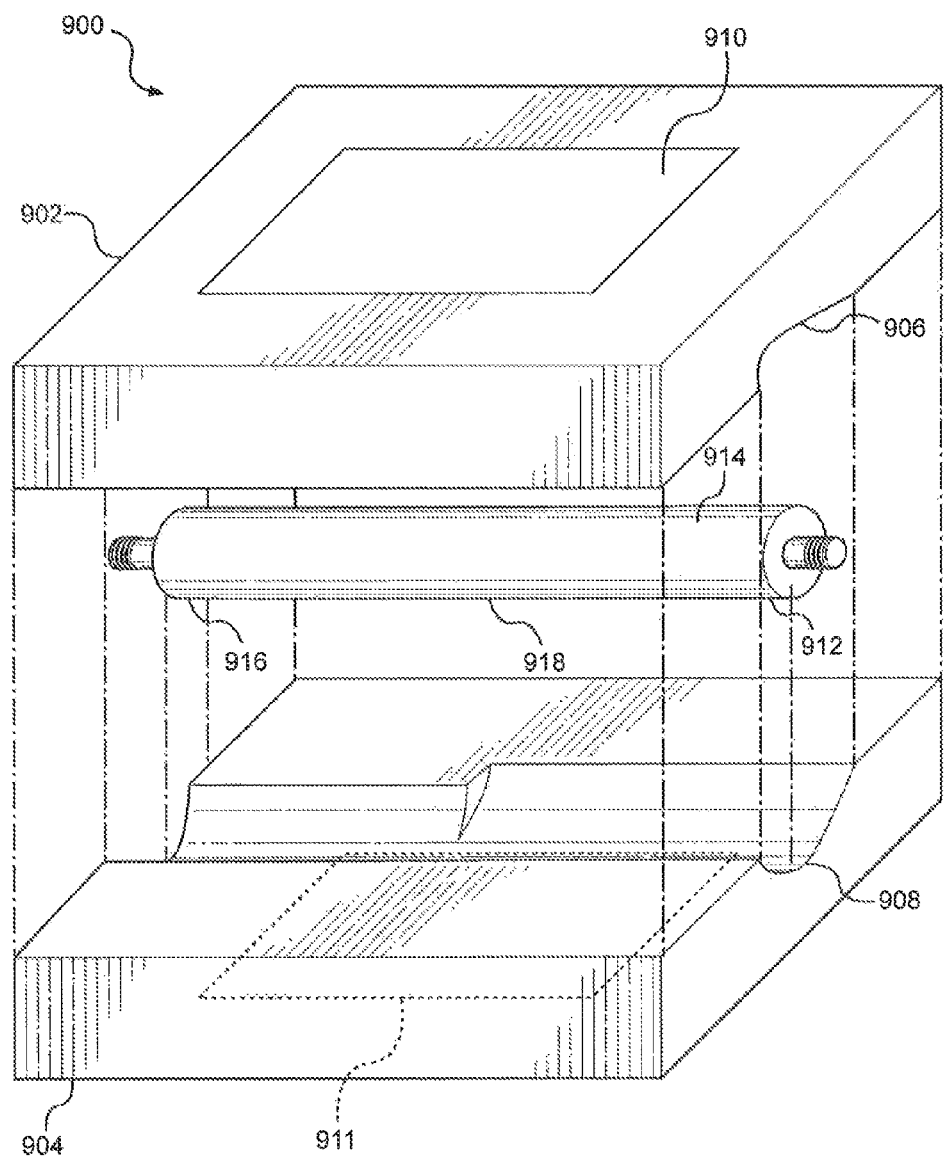
FIG. 11 is a perspective view of an alternative heated mold used to form a jacket having two different cross-sections.

Referring now to FIG. 11, a perspective view of an alternative heated mold is shown and generally referred to as 900. Mold 900 consists of upper block 902 having upper channel 906 and heater 910, lower block 904 having lower channel 908 and heater 911 (shown in dashed lines), spoke blank 912 having a first end 914 and a second end 916 and covered in a jacket 918. As shown in FIG. 11, upper and lower channels 906 and 908 transition from a first shape (Teardrop, See FIG. 7) to a second shape (Oblong, See FIG. 8). In practice, as will be discussed further below, heated mold 900 will result in a spoke where jacket 918 has a teardrop cross-section (See FIG. 7) along one portion of the spoke, which then transitions into an oblong cross-section along the remaining portion (See FIG. 8). It is to be appreciated by someone skilled in the art that spoke 912 may be formed with three or more cross-sections along the length of spoke 912 to create a specific drag profile along the length of spoke 912.

Figure 12:
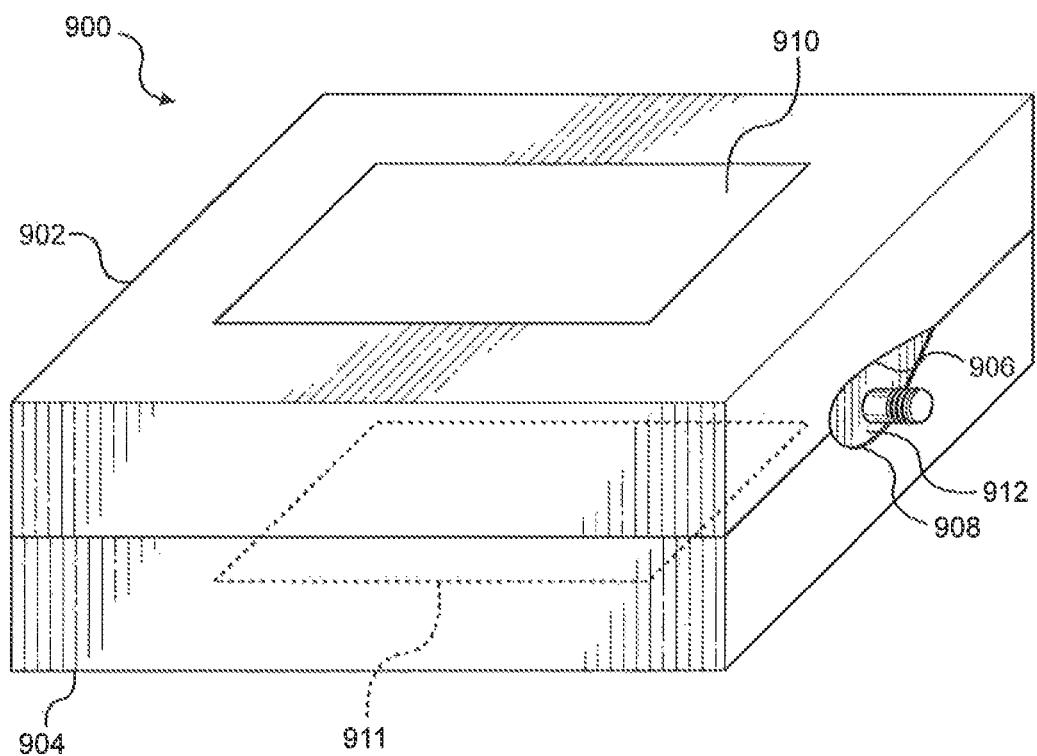
FIG. 12 is a perspective view of the alternative heated mold in FIG. 11 closed around a spoke blank.

New Referring to FIG. 12, heated mold 900 is shown in the closed position by bring upper block 902 and lower block 904 together with spoke blank 912 located between upper and lower block 902 and 904 in upper and lower channels 906 and 908. When mold 900 is in the closed position, heaters 910 and 911 are energized to heat blank 912 such that jacket 918 forms to the shape of upper and lower channels 906 and 908. After spoke 912 has formed to upper and lower channels 906 and 908, heaters 910 and 911 are de-energized to allow mold 900 and spoke blank 912 to cool to ambient temperature.

Figure 13:
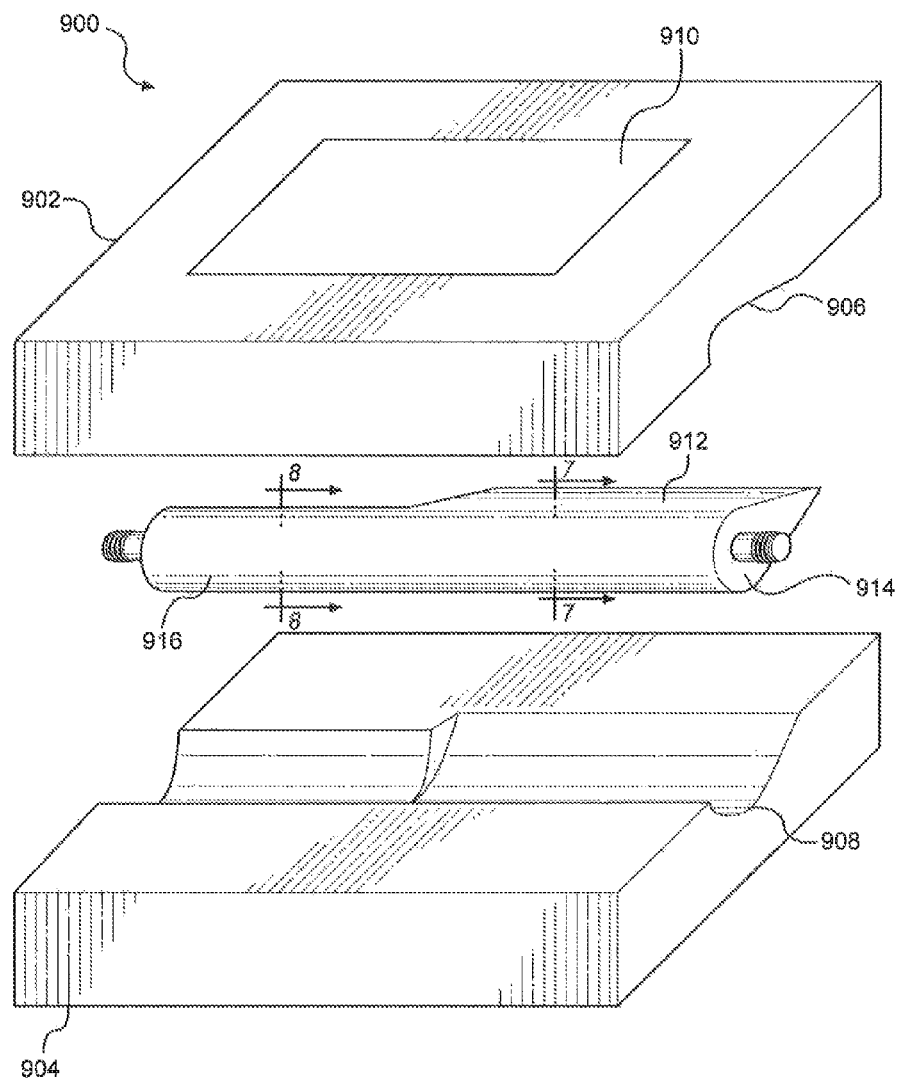
FIG. 13 is a perspective view of the alternative heated mold after separating the pieces of the mold to show a spoke having two different cross-sections.

In FIG. 13, after mold 900 and spoke blank 912 have cooled to ambient temperature, upper block 902 and lower block 904 are separated allowing spoke 912 to be removed from mold 900. As can be seen in FIG. 13, spoke 912 now has two distinct cross-sections. The first cross-section, as taken through line 7-7, at first end 914 is a tear-drop shape as seen in FIG. 7. Moving toward second end 916, spoke 912 transitions from the tear-drop shape of FIG. 7 to an oblong shape, as taken through line 8-8, as shown in FIG. 8. It is to be appreciated by someone skilled in the art that spoke 912 may be a combination of two or more shapes as needed to minimize wind resistance. For example, spoke 912 may have a teardrop shape (See FIG. 7) at first end 914 and an aerodynamic shape having pointed leading and trailing edges (See FIG. 9) at second end 916. As a further example, spoke 912 may be formed with a teardrop shape that transitions into an oblong shape that in turn transitions into a round shape.

It is to be appreciated by someone skilled in the art that the aerodynamic spoke described in reference to FIGS. 11-13 may be created by injecting the jacket material into mold 900, as described in conjunction with FIG. 10. To form a spoke, a fiber bundle is inserted into the channel formed by upper and lower channels 906 and 908 when upper block 902 is closed against lower block 904. Next, the jacket material is injected into the formed channel containing the fiber bundle. In certain embodiments, mold 900 may require the use of one of more heaters to aid in the manufacturing process. In other embodiments, the injected jacket material may be injected when mold 900 is at ambient temperature. After the spoke is formed, upper block 902 and lower block 904 are separated and the aerodynamic spoke is removed from mold 900.

While the wheel with flexible spokes of the present invention as herein shown and disclosed in detail is fully capable of obtaining the objects and providing the advantages herein before stated, it is to be understood that it is merely illustrative of preferred and alternative embodiments of the invention and that no limitations are intended to the details of construction or design herein shown other than as described in the appended claims.

I claim:

1. A wheel with aerodynamic spokes, comprising:
   a rim defining a plane;
   a hub: and
   a plurality of high strength, non-rigid, flexible spokes extending from said hub to said rim, each said high strength, non-rigid, flexible spokes comprising:
      a first end, a second end, and a fibrous core extending between said first and second ends;
      a jacket having an aerodynamic shape formed around the fibrous core;
      an anchor attached to said first end, wherein said anchor is received by said hub;
      a tube attached to said second end wherein said fibrous core extends through said tube and protrudes from said tube at a spoke angle from said plane creating a bend in said fibrous core; and
      a nipple formed to receive said tube, wherein said nipple is received by said rim,
      wherein said nipple extends through said rim radially inward, and wherein said anchor extends from said hub radially outward.

2. The wheel with aerodynamic spokes of claim 1, wherein said fibrous core comprises a plurality of filaments.

3. The wheel with aerodynamic spokes of claim 2, wherein said fibrous core comprises forty-four (44) bundles of nine-hundred ninety-six filaments in each said bundle.

4. The wheel with aerodynamic spokes of claim 2, wherein said fibrous core comprises PBO fibers.

5. The device of claim 1, wherein said jacket is made of a high performance polyamide.

6. The device of claim 1, wherein said fibrous core comprises a material having a modulus of elasticity greater than 1 million psi, an ultimate elongation of about 0.01% to 20%, and a tensile strength greater than about $0.2\times10^6$ psi.

7. The device of claim 1, wherein said tube is formed with external threads; and
   said nipple is formed with a threaded bore sized to threadably receive said threaded tube wherein threading said tube into said nipple results in tension between said rim and said hub.

8. The device of claim 7, wherein said nipple further comprises a collar, wherein said collar strikes a spoke hole formed in said rim to retain said tube in a radially inward position.

9. The device of claim 8, wherein said radially inward position of said tube is perpendicular to said rim.

10. The device of claim 7, wherein said hub is formed with a flange hole sized to pass said tube through said flange hole to position said anchor against said flange hole of said hub.

11. A wheel, comprising:
   an outer circular rim defining a plane and constructed of high strength, low weight material, having a transverse cross section, constructed with a plurality of spoke holes spaced about the circumference of the rim;
   an inner cylindrical hub mountable on an axle for concentric rotation with the rim about the axis of the axle, said hub formed with a plurality of flange holes;
   a plurality of high strength, non-rigid, flexible spokes, each said high strength, non-rigid, flexible spoke having a longitudinal axis, extending substantially radially outward from the hub to the rim, said high strength, non-rigid, flexible spokes further comprising a spoke tube at a first end wherein said high strength, non-rigid, flexible spoke extends through said tube and protrudes from said tube at a spoke angle from said plane creating a bend in said high strength, non-rigid, flexible spoke, and an anchor at a second end; and
   wherein said anchor is secured to said flange hole and said tube is secured to a nipple retained within said spoke hole of said rim and wherein said high strength, non-rigid, flexible spoke is connected between said hub and said rim at said spoke angle away from said plane.

12. The device of claim 11, wherein said high strength, non-rigid, flexible spokes further comprise a bundle of thermotropic liquid crystal fibers that exhibit low creep extending generally axially within the spoke.

13. The device of claim 11, wherein said high strength, non-rigid, flexible spokes further comprise a plastic jacket extruded onto and encapsulating the bundle of fibers to form a spoke body.

14. The device of claim 11, wherein said anchor and said tube is fixed to said high strength, non-rigid, flexible spoke.

* * * * *